US006077454A

United States Patent [19]

Tenzer

[11] Patent Number: 6,077,454

[45] **Date of Patent: *Jun. 20, 2000**

[54] FERRITE COMPOSITIONS FOR USE IN A MICROWAVE OVEN

[75] Inventor: Rudolf K. Tenzer, Martinsville, N.J.

[73] Assignee: Ceramic Powders, Inc., Joliet, Ill.

[ * ] Notice: This patent is subject to a terminal disclaimer.

[21] Appl. No.: 08/867,268

[22] Filed: Jun. 2, 1997

Related U.S. Application Data

[60] Continuation of application No. 08/590,493, Jan. 24, 1996, Pat. No. 5,665,819, which is a division of application No. 08/248,549, May 24, 1994, Pat. No. 5,464,095.

[51] Int. Cl.[7] .............................. C04B 35/26; H05B 6/80

[52] U.S. Cl. .................................... 252/62.61; 252/62.62; 252/62.6; 252/62.63; 252/62.64; 219/730; 219/759

[58] Field of Search .................................... 219/730, 759; 252/62.62, 62.6, 62.61, 62.63, 62.64

[56] References Cited

U.S. PATENT DOCUMENTS 4,362,917 12/1982 Freedman et al. ...................... 219/730
4,454,403 6/1984 Teich et al. ............................. 219/730
5,523,549 6/1996 Tenzer .................................... 219/730
5,665,819 9/1997 Tenzer ................................. 252/62.61

*Primary Examiner*—C. Melissa Koslow
*Attorney, Agent, or Firm*—Rockey, Milnamow & Katz, Ltd.

[57] ABSTRACT

A ferrite composition is created by adding a high Curie temperature ferrite, such as lithium ferrite, to a soft magnetic ferrite, such as magnesium manganese zinc ferrite. The composition is used in a microwave oven dish or laminate wrap to crisp or brown food by maintaining the food at a desired temperature during microwave operation. The high Curie temperature ferrite is preferably selected from the group consisting of lithium ferrite, nickel ferrite, copper ferrite, magnesium ferrite, strontium ferrite, barium ferrite, manganese ferrite, strontium zinc ferrite, barium zinc ferrite, and mixtures thereof. Additionally, the preferred process of making the new ferrite composition for use in microwave browning dishes includes the low-cost method of sintering raw materials in an air atmosphere. A browning plate including the ferrite compositions, and a microwave oven suitable for use with the browning plate are also disclosed.

14 Claims, 1 Drawing Sheet

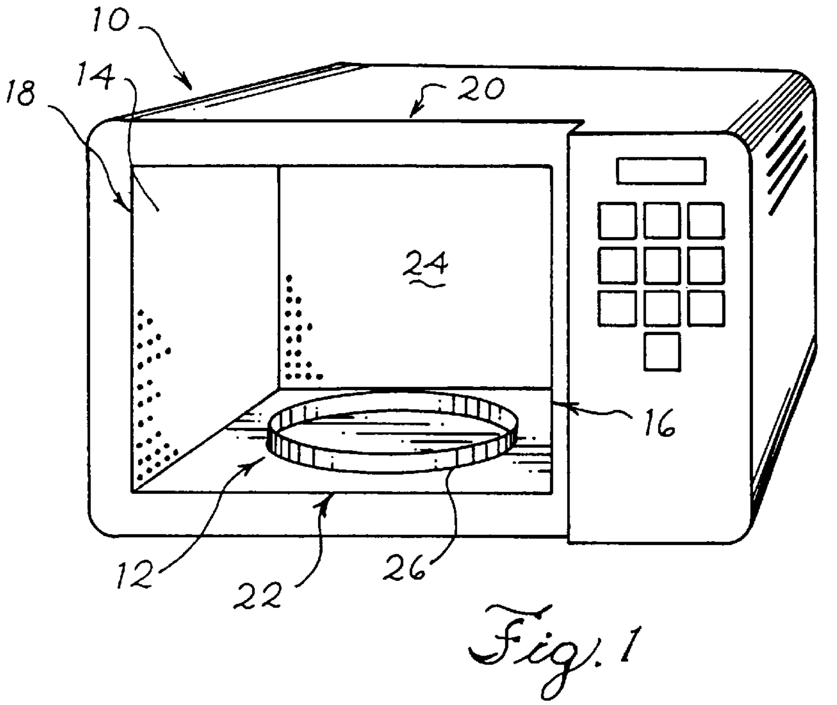
Fig. 1
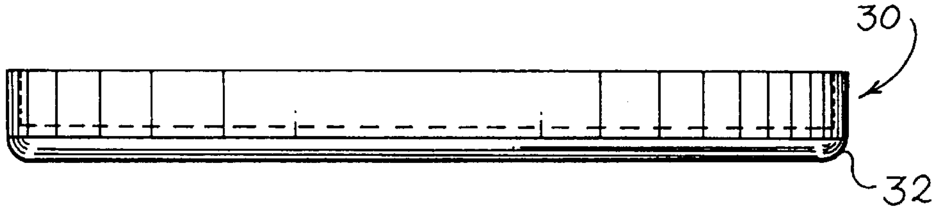
Fig. 2
Fig. 4
Fig. 3
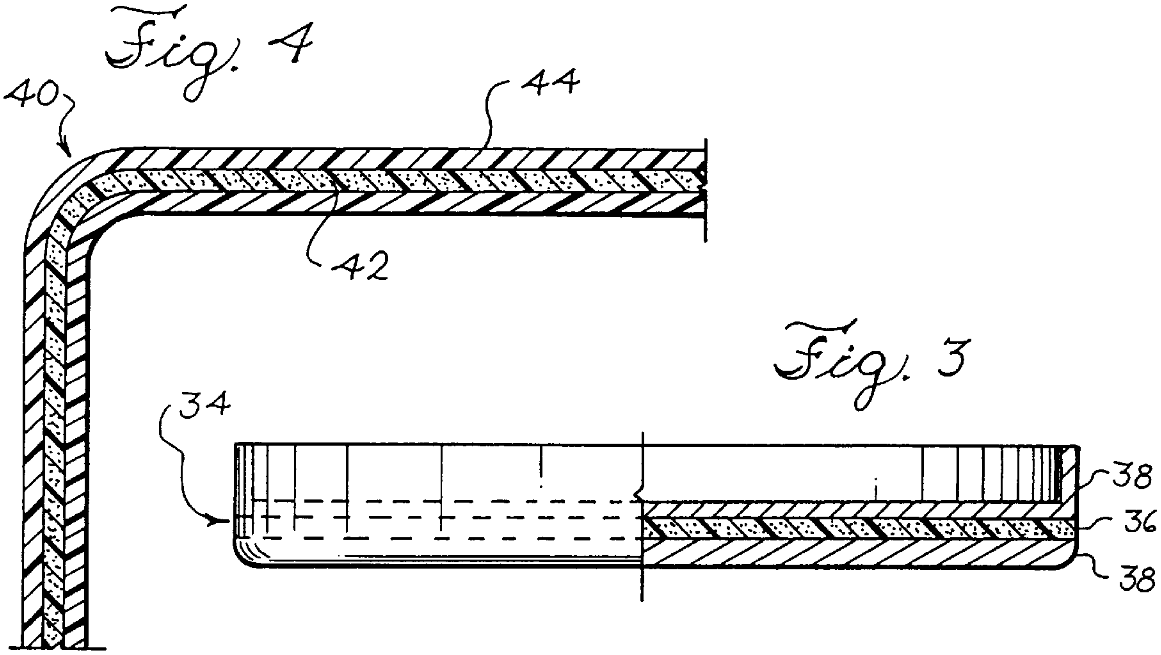

FERRITE COMPOSITIONS FOR USE IN A MICROWAVE OVEN

This application is a continuation, of application Ser. No. 08/590,493, filed Jan. 24, 1996, now U.S. Pat. No. 5,665,819, which is a division of Ser. No. 08/248,549 filed May 24, 1994, now U.S. Pat. No. 5,523,549 granted Jun. 4, 1996.

BACKGROUND OF THE INVENTION

This invention relates to the field of ferrite compositions used as browning elements in a microwave oven for browning or crisping food. More particularly, the ferrite compositions are used in a microwave oven dish or laminate to maintain the dish or laminate at a desired temperature for browning or crisping food.

Microwave ovens have been popular for many years because they heat food much faster than conventional ovens and consume less energy. However, one of the previous drawbacks for microwave cooking was the difficulty in obtaining a crust of browning food. Recent developments have made significant improvements in this area. Specifically, at least one microwave oven manufacturer now includes reusable crisping/browning elements consisting of ferrite powders embedded in plastic or rubber (see U.S. Pat. No. 5,268,546). Several manufacturers sell a metallic paper throw-away item to wrap food for crisping/browning (see e.g. U.S. Pat. No. 5,285,040).

A ferrite material currently used in reusable microwave browning dishes known as manganese zinc ferrite includes manganese, zinc, and iron oxide. Ferrite powders used for microwave crisping applications such as manganese zinc ferrite are quite expensive. These ferrite powders use a high percentage of costly raw materials such as manganese and zinc oxide. Further, these ferrite powders must be sintered in atmospheres other than air, such as nitrogen atmosphere, to prevent the manganese from converting to a higher valence during the sintering and cooling process. Special atmosphere furnaces cost 40% to 100% more than air furnaces. Also, maintenance for special atmosphere furnaces costs more than maintenance for air furnaces. Additionally, very tight control of temperature, time, and oxygen percentage is required in the process of sintering manganese zinc ferrite to create a material that will crisp food in a microwave oven. Thus, there is a need for a low-cost ferrite material for use in a microwave oven browning device.

SUMMARY OF THE INVENTION

The present invention is directed to a ferrite material that satisfies these needs. The invention relates to a ferrite composition created by adding a high Curie temperature ferrite, such as lithium ferrite, to a soft magnetic ferrite, such as magnesium manganese zinc ferrite, for use in a microwave oven dish or laminate wrap to crisp or brown food by maintaining the food at a desired temperature during microwave operation. The high Curie temperature ferrite is preferably selected from the group consisting of lithium ferrite, nickel ferrite, copper ferrite, magnesium ferrite, strontium ferrite, barium ferrite, manganese ferrite. Strontium zinc ferrite, and barium zinc ferrite. alone in a sutiable composition rauges are usable also. A preferred embodiment of the invention includes a ferrite composition comprising lithium, magnesium, manganese, zinc, and iron oxides known as lithium magnesium manganese zinc ferrite. A preferred range of embodiments comprises ferrite compositions including 1 to 10 mol % of $Li_2O$, 1 to 5 mol % of $Mn_2O_3$, 10 to 30 mol % of MgO, 10 to 30 mol % of ZnO, and 50 to 60 mol % of $Fe_2O_3$. The ferrite compositions may be embedded in plastic or rubber in connection with a microwave browning dish or coupled to a laminate wrap to brown or crisp food during microwave cooking.

Additionally, the invention relates to the process of making the new ferrite compositions for use in microwave browning dishes including the low-cost method of sintering raw materials in an air atmosphere.

This invention is also related to a browning plate including the ferrite compositions. A preferred embodiment of the browning plate preferably includes a heat conducting metal plate having an underside, the underside arranged to be stably and detachably carried by a microwave oven bottom plate. The browning plate preferably includes a layer of ferrite material substantially covering the underside of the browning plate. The ferrite material has a Curie temperature of about 140 to about 400 degrees Celsius that will depend on the specific chemistry chosen. The browning plate is heated substantially by absorption in the layer of ferrite material of inductive field energy from microwaves propagating within a microwave oven cavity.

This invention relates further to a combination of a microwave oven and a browning dish including the ferrite composition. The microwave oven has an oven cavity including a bottom wall, sidewalls, and a roof. The browning dish includes a heat conducting plate having a first side for supporting the food and a second side provided with a layer of ferrite material including the ferrite composition. The preferred ferrite composition includes 3 to 5 mol % $Li_2O$, 2 to 3 mol % $Mn_2O_3$, 18 to 22 mol % MgO, 17 to 20 mol % ZnO, and 52 to 57 mol % of $Fe_2O_3$. Also, the microwave oven includes a spacer for creating a space between the browning dish and the cavity bottom. Further, the microwave oven includes a microwave source for generating microwaves, and a system for directing microwaves from the microwave source into the oven cavity. This system comprises a wave guide device having at least one opening arranged to establish a field concentration of microwaves along the layer of ferrite material for generating magnetic losses therein and thereby heating the heat conducting plate.

An advantage of the present invention is that raw materials for the new ferrite compositions may be economically sintered in an air atmosphere at elevated temperatures, thus avoiding the costly special atmosphere sintering process step used in prior art ferrites for microwave browning and crisping. The ferrite compositions also reduce manufacturing raw material costs since these ferrites include a substantially higher percentage of inexpensive iron oxide than prior art ferrites.

Another advantage of the new ferrite compositions is that the Curie temperature of the composition corresponds to the percentage of the high Curie temperature ferrite, preferably lithium ferrite, used in the composition. Thus, the amount of browning and/or crispness may be adjusted according to the type of food and a consumer's taste. Adjustable crispiness arises from improved quality control as to the desired microwave dish operating temperature and may provide for new microwave crisping and browning products.

A further advantage of the present invention is that a microwave oven browning plate including the new ferrite composition heats up to the desired temperature more quickly than with prior art ferrites, allowing shorter cooking times. Thus, the new ferrite compositions provide improved performance in microwave oven browning dishes and laminates and reduce the raw material cost, the equipment cost, and the overall cost of manufacture.

These and other features, aspects, and advantages of the present invention will become better understood with regard to the following description, appended claims, and accompanying drawings.

BRIEF DESCRIPTION OF THE DRAWINGS

FIG. 1 shows a microwave oven including a browning plate and a layer of ferrite material attached to the bottom of the browning plate;

FIG. 2 shows a silicone rubber housing including a ferrite layer attached to a metal browning plate supporting a food item;

FIG. 3 shows a silicone rubber housing including a ferrite layer, the housing inserted between two layers of metal in the metal browning plate; and FIG. 4 shows a disposable laminate for use in browning food in a microwave oven, the laminate including a plastic film having ferrite particles.

DETAILED DESCRIPTION OF THE DRAWINGS AND PREFERRED EMBODIMENTS OF THE INVENTION

A preferred embodiment of a ferrite composition according to the present invention may be made by combining two or more component ferrites into a single ferrite composition. A first ferrite component comprises a high Curie temperature ferrite material. Examples of high Curie temperature ferrite materials include, but are not limited to, lithium ferrite, nickel ferrite, copper ferrite, magnesium ferrite, strontium ferrite, barium ferrite, manganese ferrite, strontium zinc ferrite, and barium zinc ferrite. A second component comprises a soft ferrite material such as magnesium zinc ferrite or magnesium manganese zinc ferrite.

By varying the ratio of these two ferrite components, a series of ferrite compositions may be developed having pre-selected Curie temperatures covering the entire range of desirable temperatures for cooking foods in a microwave oven. Ferrite compositions created according to the present invention by combining the first and second component ferrites, may be used as temperature control elements for browning or crisping food contained in either disposable or non-disposable items for microwave cooking.

In a first preferred embodiment, a magnesium manganese zinc ferrite may be used as the soft ferrite component and lithium ferrite may be used as the high Curie temperature ferrite component. Magnesium manganese zinc ferrite was chosen since this material may be sintered in air atmosphere. This is advantageous since the prior compositions must be sintered in nitrogen atmosphere, thereby adding to the cost of manufacturing. Lithium ferrite was chosen as the high Curie temperature ferrite since it has a very high Curie temperature of 670 degrees Celsius. Also, the lithium ferrite component preferably contains at least 90 weight % iron oxide. Thus, the preferred composition contains a greater percentage of low-cost iron oxide than prior art microwave oven ferrites, thereby reducing raw material costs.

The process of making a preferred embodiment of a ferrite composition according to the present invention will now be disclosed in detail by way of an example.

EXAMPLE OF THE PREFERRED EMBODIMENT

Start with the following raw materials: iron oxide with a fineness of less than one micron such as Product No. TI5555 manufactured by Magnetic International, Inc., 1111 North State Route 149, Burns Harbor, Ind. 46304; magnesium oxide having a fineness of about 4 microns such as MAGCHEM30 manufactured by Martin Marietta, Magnesia Specialties, Inc., P.O. Box 398, Manistee, Mich. 49660; zinc oxide having a fineness of about 2 microns such as KADOX920 manufactured by Zinc Corp. of America, 1300 Frankfort Road, Monaca, Pa. 15061; manganese dioxide having a granular form such as $MnO_2$-High Purity (HP) manufactured by Chemetals, 711 Pittman Road, Baltimore, Md. 21220; and lithium carbonate having granular form such as Product No. 51075 manufactured by Cyprus Foote Minerals Co., 301 Lindenwood Drive, Malvern, Pa. 19355.

In order to obtain a uniform ferrite chemistry, it is necessary to mix all of the raw materials in a finely divided state. The two granular raw materials, manganese dioxide, and lithium carbonate, were first ground to a median particle size of about three microns. A dry ball mill having an 8 inch diameter and a 9 inch length was used to grind the granular raw materials. The granular raw materials were ground for 6 hours using a 50% volume charge of 0.5 inch diameter polished steel balls. The powder charge per batch was 1000 grams. All of the raw materials then had a particle size of about 3 microns or less and were ready to be mixed.

To determine the correct weight percent of each raw material to be mixed, the formulas for lithium ferrite and magnesium manganese zinc ferrite were calculated separately. Lithium ferrite contains about 3.6 weight % lithium oxide and about 96.4 weight % iron oxide. The starting materials for lithium ferrite (lithium carbonate and iron oxide) were weighed out with a higher lithium content than the above formula based on the knowledge that some of the lithium oxide would be lost due to volatilization during the sintering process. Thus, the weight percentages used were 10% lithium carbonate and 90% iron oxide.

The formula used for the magnesium manganese zinc ferrite was about 24 mole % magnesium oxide, about 3.1 mole % manganese oxide, about 22.6 mole % zinc oxide, and about 47.4 mole % iron oxide. This translates into a weight formulation of about 9% magnesium oxide, about 4.5% manganese oxide, about 17% zinc oxide, and about 69.5% iron oxide.

This magnesium manganese zinc ferrite is commonly known to have a Curie temperature of 115 degrees Celsius +/−5 degrees, depending on the exact sintering conditions. Lithium ferrite is known to have a Curie temperature of about 670 degrees Celsius. By systematically varying the ratio of these two ferrites, a series of ferrites can be achieved where the ferrites have a pre-selected Curie temperature between 115 degrees Celsius and 670 degrees Celsius. Table 1 lists the calculated Curie temperatures for various percentages of lithium ferrite and magnesium manganese zinc ferrite as used in this example.

TABLE 1

Calculated C.T. for Various % of Li & Mg Mn Zn Ferrites

| % Li Ferrite | % Mg Mn Zn Ferrite | C.T. (Celsius) |
|---|---|---|
| 0 | 100 | 115 |
| 5 | 95 | 143 |
| 10 | 90 | 171 |
| 15 | 85 | 198 |
| 20 | 80 | 226 |
| 25 | 75 | 254 |
| 30 | 70 | 282 |
| 35 | 65 | 309 |
| 40 | 60 | 337 |

TABLE 1-continued

Calculated C.T. for Various % of Li & Mg Mn Zn Ferrites

| % Li Ferrite | % Mg Mn Zn Ferrite | C.T. (Celsius) |
|---|---|---|
| 45 | 55 | 365 |
| 50 | 50 | 393 |

For the present example, a ferrite chemistry of about 25% lithium ferrite, and 75% magnesium manganese zinc ferrite was chosen. The mole percentages of this composition is substantially as follows: 4 mol % $Li_2O$, 20 mol % MgO, 2.3 mol % $Mn_2O_3$, 18.5 mol % ZnO, and 55.2 mol % $Fe_2O_3$. Accordingly, this composition requires substantially the following weight percentages of raw materials: 2.5% $Li_2CO_3$, 3.4% $MnO_2$, 12.8% ZnO, 6.8% MgO, and 74.5% $Fe_2O_3$.

A batch of about 3000 grams of the raw materials was weighed out according to these weight percentages. Each weighing was made to an accuracy of +/−0.01 gram. The batch was then dry mixed for 20 minutes and screened through a 20 mesh screen (850 microns) to break down any very large agglomerates in the batch.

Next, approximately 20 weight percent water was slowly added over a 20 minute period to form a damp powder. A mixer, such as a Hobart mixer, was then turned on its highest speed for another 10 minutes to intensely mix the damp powder. The powder was then pelleted into raw mix slugs approximately ¼ to ½ inch in size.

These pelleted raw mix slugs were then placed in sagger boxes and heated to about 1230 degrees Celsius in approximately 12 hours. The soak time at this temperature was about two hours. When this mixture was heated to an elevated temperature, the carbon dioxide was liberated leaving about 4.3 weight percent lithium oxide. However, a person having ordinary skill in the art will recognize that the amount of lithium oxide remaining will vary with the heating temperature and the duration of the sintering process.

The now sintered ferrite was cooled to room temperature in approximately 8 hours. The ferrite material was then crushed, such as in a Denver laboratory cone crusher, and screened through 60 mesh (250 microns). The crushed ferrite comprises a ferrite composition capable of use as a browning element of a microwave oven dish or laminate for maintaining the temperature of food cooked during operation of the microwave oven. The temperature of this exemplary ferrite composition was about 250–260 degrees Celsius.

The crushed ferrite powder can be mixed with silicone rubber using standard roll mills as currently used in the rubber industry. The silicone rubber/ferrite mix was then attached to an aluminum heat conducting dish using the process of injection molding; however, other attachment techniques such as use of adhesives may be used.

Alternatively, the crushed ferrite powder may be embedded into a disposable material for use as a microwave laminate wrap for browning food. The dish or laminate is now ready to be used in a microwave oven as a device for browning or crisping food during microwave operation.

Upon testing, it was discovered that the exemplary ferrite material has superior and unexpected properties. For example, the rate of cooking food on the above-mentioned dish is about 10% faster than with prior art microwave oven browning plates. Mlore specifically, four separate ferrite compositions were prepared and tested. Sample 1 was prior art manganese zinc ferrite sintered and cooled in a nitrogen atmosphere, Sample 2 was manganese zinc ferrite sintered and cooled in air, Sample 3 was magnesium manganese zinc ferrite sintered and cooled in air, and Sample 4 was lithium magnesium manganese zinc ferrite according to the present invention.

Each of the four samples was mixed with 34 weight percent silicone rubber 66 weight percent ferrite and attached to the bottom of aluminum pans. Each pan was placed in the same microwave oven and heated for 15 to 20 minutes. The pans for Samples 2 and 3 did not reach above 160 degrees Celsius and were therefore not usable. The pan for Sample 1 reached 210 degrees Celsius and the pan for Sample 4 reached 230 degrees Celsius. None of the samples reached its Curie temperature, but Sample 4 using the lithium ferrite was the best performer.

It should be noted that Sample 4 had a lower temperature than the calculated Curie temperature as shown in Table 1. A reason for this is that the ferrite composition only comprises about 60% to 80% by weight of the housing with the remainder being silicone rubber. The lower the percentage of ferrite composition in the ferrite-silicone housing, the greater the difference between the operating temperature of the browning dish including the housing and the calculated A ferrite composition Curie temperature. Another reason is the dissipation of heat by the plate and the ferrite housing into the microwave oven, resulting in an equilibrium temperature lower than the Curie point.

Although the above example concentrated on the use of lithium ferrite as the high Curie temperature ferrite component, a person skilled in the art could easily substitute other high Curie temperature ferrites. For example, nickel ferrite with a Curie temperature of 585 degrees Celsius, or copper ferrite with a Curie temperature of 450 degrees Celsius, could be substituted for lithium ferrite. Also, the housing may be made from materials other than silicone rubber such as high temperature plastics.

A ferrite including 25% copper ferrite and 75% magnesium manganese zinc ferrite (Curie temperature of 115 degrees Celsius) would have a calculated Curie temperature of about 200 degrees Celsius. As another example, a ferrite including 25% nickel ferrite and the same 75% magnesium manganese zinc ferrite would have a calculated Curie temperature of about 230 degrees Celsius. However, lithium ferrite is preferable since lithium ferrite is less expensive to produce and currently has an economic advantage over the other high Curie temperature ferrites.

Further, the ferrite composition of the present invention uses air atmosphere firing reducing manufacturing costs as compared to prior art manganese zinc ferrite. Moreover, a range of microwave oven plates can be easily developed having a broad spectrum of desired temperatures that cover the entire line of cooking ranges. For, example a ferrite having a higher lithium ferrite concentration would reach a higher equilibrium temperature than the disclosed example and could be used as an "extra crispy" microwave oven dish.

FIG. 1 shows a microwave oven 10 and a browning plate 12 including the ferrite composition. The microwave oven has a cavity 14 with a first sidewall 16, a second sidewall 18, a roof 20, a bottom 22, and a back wall 24. Microwaves generated from a microwave source (not shown) are supplied via a waveguide (not shown) into the cavity 14 from an opening formed in the first sidewall 16.

The browning plate 12 has an underside 26 that is provided with a layer of ferrite material. The layer covers substantially the entire underside 26 of the browning plate 12. The layer of ferrite material comprises a ferrite composition, as described in detail above, including a high Curie temperature ferrite component, such as lithium ferrite, and magnesium manganese zinc ferrite. By varying the concentration of the high Curie temperature ferrite, the Curie temperature of the layer of ferrite material can be adjusted to a preselected temperature from about 140 to about 400 degrees Celsius. The browning plate 12 is made from a heat conducting material such as aluminum. The browning plate 12 is spaced from the cavity bottom 22 a spacer such as a bottom plate or other suitable spacing structure. Preferably, the opening in side wall 16 is disposed adjacent to the space created between the bottom of the browning plate 12 and the cavity bottom 22.

FIG. 2 shows a metal browning plate 30 and a silicone rubber housing 32 including a ferrite material attached to the browning plate 30. The browning plate 30 is capable of supporting food items. The flexible silicone rubber housing 32 includes 60–80 weight percent of a ferrite composition according to the present invention. The ferrite composition may be in the form of powdered ferrite that can be embedded into the flexible rubber or plastic housing. The flexible housing may be attached to a reusable item such as a dish or plate.

FIG. 3 shows another possible embodiment of a browning plate 34 including a housing 36 inserted between two layers of metal 38 forming the plate 34. Also, the housing 36 includes the ferrite composition according to the present invention.

FIG. 4 shows a disposable system 40 such as a laminate wrap made from plastic or paper incorporating the ferrite composition 42. The ferrite composition is incorporated into a thin plastic laminate 44. This laminate 44 may then be wrapped around a food item and placed in a microwave oven. The laminate 44 consists of at least one layer including the ferrite composition 42 of this invention. The ferrite composition 42 acts as both a heat source and as a temperature control element. Preferably, the ferrite composition 42 has a particle size of 2 to 100 microns. Use of a single layer including the ferrite composition 42 has the advantage of simplified manufacturing yielding improved economies of production.

During microwave operation, magnetic losses are created by microwaves passing through the ferrite composition thereby creating heat energy. When the Curie temperature of the ferrite composition has been reached, magnetic losses generated from the ferrite composition decrease rapidly to a very low level. The temperature will then begin to decrease due to the absence of magnetic losses; however, some heat will continue to be generated due to dielectric losses. As soon as the temperature drops to a level below the preselected Curie temperature of the ferrite composition, magnetic losses will again be converted to heat from the microwave energy in the ferrite composition and the temperature of the item will again rise. This cycle continues until the microwave oven is turned off. Thus, the ferrite composition acts as a thermostat controlling the temperature of the microwave item within a desired narrow range.

A series of disposable laminates 44 can be produced having ferrites with pre-selected Curie temperatures that cover the entire temperature range applicable for cooking foods.

Although the present invention has been described in considerable detail with reference to certain preferred embodiments thereof, other embodiments are possible. Therefore, the spirit and scope of the appended claims should not be limited to the description of the preferred embodiments contained herein.

What is claimed is:

1. A method of producing a crusted ferrite material comprising the steps of:

(a) combining a first ferrite component comprising a soft ferrite material comprising manganese zinc ferrite with a second ferrite component selected from the group consisting of lithium ferrite, copper ferrite, magnesium ferrite, strontium ferrite, and magnesium manganese ferrite to form a mixture; and (b) sintering said mixture to produce the ferrite material; and (c) crushing said ferrite material to produce the crushed ferrite material.

2. A method of producing a crushed ferrite material comprising the steps of:

combining a first ferrite component comprising a soft ferrite material with a second ferrite component selected from the group consisting of lithium ferrite, copper ferrite, magnesium ferrite, strontium ferrite, and magnesium manganese ferrite to form a mixture;

sintering said mixture to produce a ferrite material; and crushing said ferrite material to produce the crushed ferrite material.

3. A method of producing a microwave oven dish, the method comprising the steps of:

providing a ferrite material, said ferrite material including iron oxide and zinc oxide, and at least one component selected from the group consisting essentially of lithium oxide, copper oxide, magnesium oxide, manganese oxide, and strontium oxide, said ferrite material formed from a size reduced mixture;

incorporating said ferrite material into a housing; and attaching said housing to a dish to form the microwave oven dish.

4. The method of claim 2, wherein said housing comprises a flexible housing made from a rubber material.

5. The method of claim 2, wherein said housing is attached to said dish by injection molding.

6. The method of claim 2, wherein said ferrite material has a self-limiting temperature between about 140 and about 400 degrees Celsius.

7. The method of claim 2, wherein said ferrite material comprises a sintered and crushed ferrite powder.

8. The method of claim 7, wherein said housing is formed by mixing a silicon rubber material with a sintered and crushed ferrite powder.

9. The method of claim 8, wherein said housing includes between 60 and 80 weight percent of the sintered and crushed ferrite powder.

10. The method of claim 2, wherein said size reduced mixture has particles of a size less than about three microns.

11. The method of claim 2, wherein said size reduced mixture is produced by grinding raw materials.

12. A method of producing a microwave oven dish, the method comprising the steps of:

providing a ferrite material, said ferrite material including iron oxide and zinc oxide, and at least one component selected from the group consisting essentially of lithium oxide, copper oxide, magnesium oxide, manganese oxide, and strontium oxide, said ferrite materials formed from a size reduced mixture, said ferrite material comprising a sintered and crushed ferrite powder having a self-limiting temperature greater than 140 degrees Celsius;

forming a flexible housing by mixing a silicon rubber material with said sintered and crushed ferrite powder; and injection molding said flexible housing including a mixture of said silicon rubber material and said sintered and crushed ferrite powder to attach said flexible housing to a heat conducting dish to form the microwave oven dish.

13. The method of claim 12, wherein said ferrite material has a particle size less than 250 microns.

14. A method of producing a plastic or rubber housing containing a ferrite material, the method comprising the steps of:

combining a first ferrite component comprising a soft ferrite material comprising manganese zinc ferrite with a second ferrite component selected from the group consisting of lithium ferrite, copper ferrite, magnesium ferrite, strontium ferrite and magnesium manganese ferrite to form a mixture;

sintering and crushing said mixture to produce the ferrite material; and incorporating said ferrite material into said plastic or rubber housing.

* * * * *

UNITED STATES PATENT AND TRADEMARK OFFICE

CERTIFICATE OF CORRECTION

PATENT NO. : 6,077,454
DATED : June 20, 2000
INVENTOR(S) : R.K. Tenzer

It is certified that error appears in the above-identified patent and that said Letters Patent is hereby corrected as shown below:

Title page, Related U.S. Application,
Under section [60], please delete "5,464,095 and insert -- 5,523,549 --.

Column 1,
Line 61, please delete "rauges" insert -- range --.

Column 5,
Line 67, please delete "Mlore" and insert -- More --.

Column 6,
Line 26, please delete "A ferrite" and insert -- ferrite --.

Signed and Sealed this

Eleventh Day of September, 2001

*Attest:*

Nicholas P. Godici

NICHOLAS P. GODICI

*Attesting Officer* *Acting Director of the United States Patent and Trademark Office*